Sept. 23, 1969.  C. A. NILSSON  3,468,670
DRY CULTURED BUTTERMILK PROCESS
Filed May 12, 1966  2 Sheets-Sheet 1

INVENTOR
CLARENCE A. NILSSON
BY
ATTORNEY

Sept. 23, 1969    C. A. NILSSON    3,468,670
DRY CULTURED BUTTERMILK PROCESS
Filed May 12, 1966    2 Sheets-Sheet 2

INVENTOR
CLARENCE A. NILSSON
BY Joseph G. Werner
ATTORNEY

United States Patent Office 3,468,670
Patented Sept. 23, 1969

3,468,670
DRY CULTURED BUTTERMILK PROCESS
Clarence A. Nilsson, Glen Ellyn, Ill., assignor to H. C. Christians Co., Chicago, Ill., a corporation of Wisconsin
Filed May 12, 1966, Ser. No. 549,541
Int. Cl. A23c *17/00, 9/12*
U.S. Cl. 99—59     6 Claims

ABSTRACT OF THE DISCLOSURE

A dry cultured buttermilk product is prepared by preheating a quantity of fluid skim milk, concentrating the heated skim milk to a total solids of about 20 to 45%, cooling the concentrate to about 70 to 90° F., culturing the concentrate with a lactic acid producing bacterial culture to about .20 to .30% titratable acidity, heating the cultured concentrate to kill the bacteria, and drying the cultured concentrate. A whey product is preferably added in the amount of about 5 to 15% before one of the steps of concentrating, culturing, or drying.

---

This invention relates to cultured buttermilk products. In particular, this invention relates to an improved process for culturing milk products, and to a dry cultured buttermilk product of improved taste and uniformity.

It is a common practice in the dairy industry to produce products by culturing (addition of bacterial culture and holding at proper temperatures for acid development) milk and milk products. Cultured buttermilk, an item of commerce, is manufactured from skim milk to which is added nonfat dry milk in order to bring the total solids content to between 9.5 and 11%. A milk product of suitable total solids content may also be prepared by the reconstitution of nonfat dry milk and water to a desired solids level. The skim, or nonfat milk, is then heated to temperatures of 185° to 195° F. and held for a period of 20 to 30 minutes. Upon cooling to approximately 70° F., the milk is inoculated with .5 to 1.5% of active bacterial culture (lactic-type). After 12 to 16 hours, the acidity reaches a desired level of .80 to .90% and is cooled to 40° F., or lower. The desired amount of salt and (optional) butter granules are added prior to bottling.

Dried cultured buttermilk manufactured by the concentrating and subsequent drying of the above cultured product is an item of commerce and commonly known as "High Acid Cultured Buttermilk." The cultured buttermilk produced by this process results in an extremely sour (high acid) product, which substantially limits its use in the manufacture of food items. The high level of acidity can adversely affect the end food product in instances where a highly sophisticated leavening agent is applied. Further limitations are imposed due to a higher viscosity of reconstituted product and ultimately considerably higher insolubility. The presence of greater than normal amounts of scorched milk particles is a further limiting factor.

Dried sweet cream buttermilk is another item of commerce—this product being manufactured from a by-product of a churning of sweet cream. Dried sweet cream buttermilk, when in the form of cream prior to churning, receives a heat treatment equivalent to, or considerably higher than, the pasteurization temperatures. Again, upon being processed into the dry product, it is subjected to temperatures of usually 165° to 185° F. for a period up to 30 minutes, concentrated, and again heated to approximately 165° before drying. Dried sweet cream buttermilk, perhaps more than any other dairy product, is highly subject to seasonal variations in chemical and physical properties. The amount of butterfat present in dried sweet cream buttermilk must be a legal minimum of 4½%, but there is no maximum amount of butterfat specified in federal or industry standards. The fat content of this product is not pure butterfat, but also contains large amounts of fat-like proteinaceous material best described as phospholipids.

There being an ever-increasing demand for buttermilk powders in the convenience food industry, coupled with a decreasing supply, an acute shortage of dry buttermilk powders suitable for widespread use in the manufacture of food products has developed. Dry cultured buttermilk produced by my method will insure a virtually inexhaustible supply and a much more uniform product.

Therefore, it is a primary object of this invention to provide a process for the production of dry cultured buttermilk with increased functional characteristics and with a uniformity unobtainable in either sweet cream buttermilk powders or the product commonly known as High Acid Cultured Buttermilk.

An additional object of this invention is to provide a dry cultured buttermilk product having a level of acidity which will not deleteriously affect leavening and/or other processes normally employed in the manufacture of finished food products.

A further object of this invention is to provide a product of controlled viscosity upon mixing a slurry or full reconstitution.

A further object is to provide a consistently uniform product with virtually no variances or variables in chemical or physical properties, including fat content.

A further object of this invention is to provide control of water absorption in products where this is an important factor.

A further object of this invention is to provide a product with a level of fat content or flavor desirable in certain end food products.

Still another object of this invention is to provide a process insuring a plentiful supply of dry buttermilk products to food manufacturers, who are presently confronted with either a very non-uniform buttermilk product or a threatened shortage of buttermilk products.

Other objects and advantages of the present invention will become obvious from the following detailed description taken in conjunction with the accompanying drawings.

Figure 1:
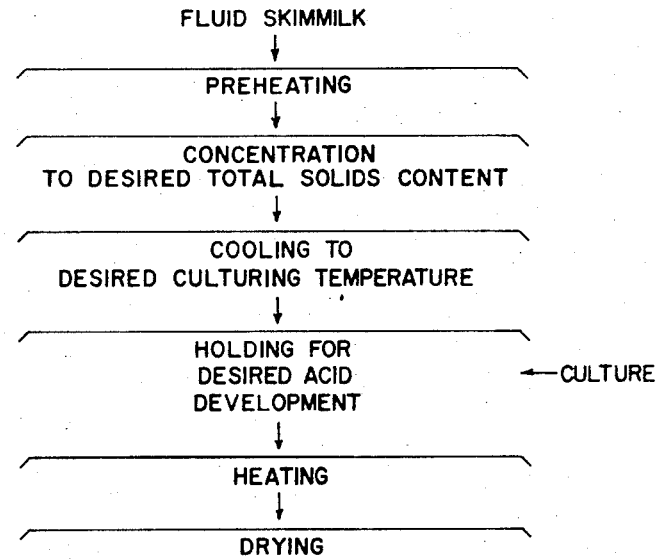
FIG. 1 is a flow sheet generally illustrating the steps of my process.
Figure 4:
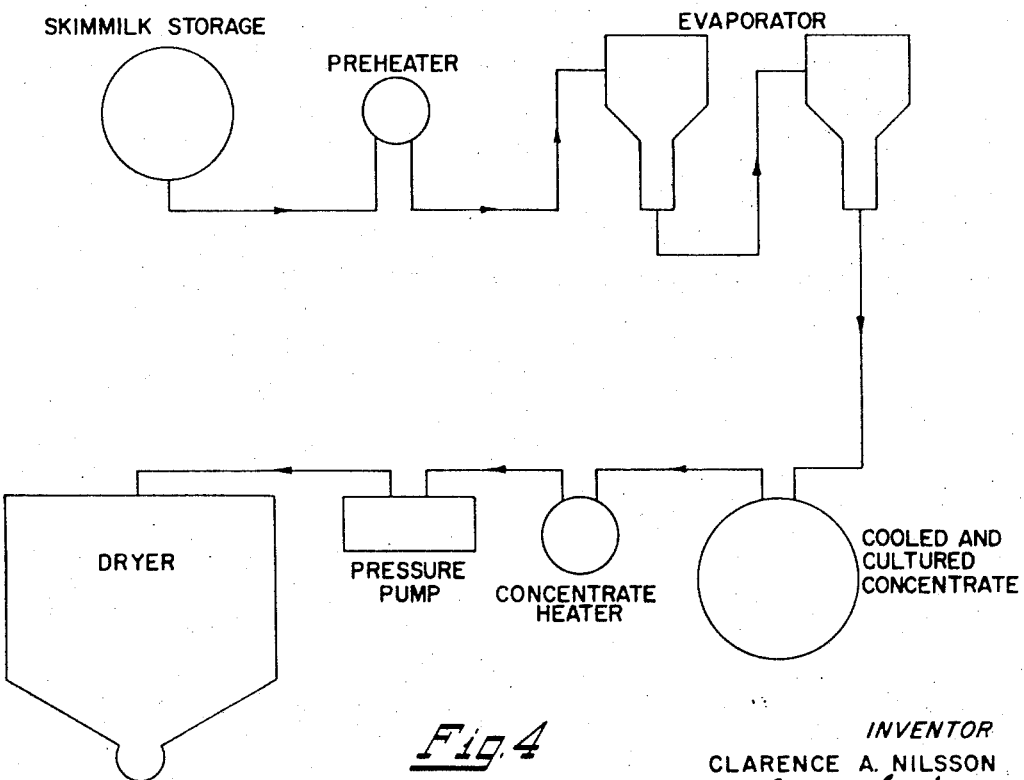
FIG. 4 is a schematic diagram of apparatus and the sequence of operations which may be employed in carrying out my process.

Referring now more particularly to the drawings, FIG. 1 illustrates a preferred method of making dry cultured butter milk in accordance with my invention. Whereas the previously accepted procedure for manufacturing dry cultured buttermilk involves the culturing of fluid skim milk prior to subsequent heating, concentrating and final drying, it is seen that my invention involves the culturing of milks which have been previously concentated to a desired total solids content. A preferred embodiment of my process is as follows:

Fluid skim milk is preheated to 170° F. for 30 seconds through a preheater and holding tube. It is then pumped to an evaporator and concentrated to 26% total solids. Next it is cooled to 80° F., and a lactic acid producing bacterial culture is added in an amount of from 1 to 5% of the concentrate, 1 to 3% being preferred. The innoculated concentrate is held at substantially constant temperature for a period of 18 hours, or until the concentrate reaches a desired level of titratable acidity of from approximately .20 to .30%, to culture the concentrate. It is then heated to 165° F. and spray dried in a conventional manner to produce the final desired dry cultured buttermilk product. The sequence of the above process steps may be more easily understood by reference to schematic FIG. 4.

Figure 3:
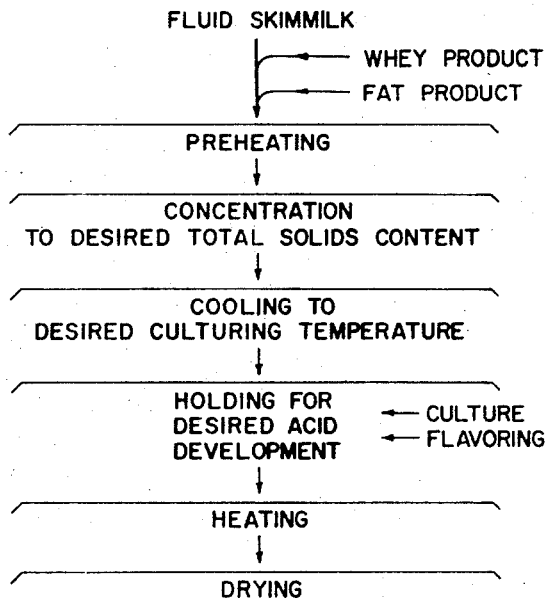
FIG. 3 is a flow sheet illustrating further steps which may be employed in my process.

A preferable additional step in the above-described process involves the addition of whey product in the amount of between approximately 5 and 15%, on a dry solids basis, of the product being treated. Such whey product may be added prior to heating and concentrating the fluid skim milk as indicated in FIG. 3, prior to culturing the concentrate, or prior to heating and drying the cultured concentrate. The term "whey product" as used here refers to common whey, and more preferably whey having a less than normal percentage of lactose, such as the by-product of a de-lactosing operation.

The addition of whey product as described improves ease of processing in that the product being treated is rendered less viscous, does not so readily adhere to heating surfaces, and does not coagulate in spray nozzle equipment. In addition the final product including whey product is superior to that without whey product in that it is more dispersible and soluble in liquids and is therefore more suitable for use in convenience food products.

The above-described preferred process may be subjected to considerable variation without departing from my invention. Whereas I consider a temperature of 170° F. for a duration of 30 seconds to be optimum for the preheating step of my process, temperatures between approximately 160° F. and 190° F. may be employed for periods of time up to 30 minutes or more. Other heating methods involving direct steam injection may be used for lesser periods at temperatures as high as 300° F. In this regard, I have found that as the preheating temperature and duration are increased, the rate at which the bacterial culture flourishes in the milk after concentration shows a corresponding increase. However, excessive heat will produce other characteristics in the final product which are undesirable for some product uses. As a minimum enough heat should be employed for a sufficient time to effectively kill any bacteria present in the milk.

While I have found a solids concentration of approximately 26% to be optimum for reaching a desired level of acidity in a minimum amount of culturing time, solids concentrations of from approximately 20% to 45% may be successfully employed in carrying out my process.

My preferred temperature for culturing is 80°. However, different charateristics may be produced in the final product by using temperatures as high as approximately 90° F. and as appoximately 70° F. It may also be desirable in some instances to vary the culturing temperature within the above range, depending upon the culture used.

Any conventional type of lactic acid producing active bacterial culture organism may be employed to innoculate the concentrate, *Streptococcus lactis* being a suitable example.

Growth of the bacterial culture in the innoculated concentrate may be enhanced in accordance with known techniques by adding a quantity of citric acid in an amount between approximately .10 and .22% of the total concentrate at the time the bacterial culture is added.

Sufficient heat should be applied to the cultured concentrate prior to spray drying to achieve a final dry product which is within the bacterial standards required for similar dry dairy products. At a minimum, a temperature of 160° F. should be employed, with 170% F. preferred. With steam injection heating, temperatures in excess of 250° F. may be employed for shorter periods of time. It will usually not be desirable from an economic standpoint to employ more heat than is necessary to insure a proper bacteria kill.

Varying degrees of density of the final product may be obtained in accordance with known drying techniques by varying the size of the nozzles of the spray dryer and the amount of pressure applied at the nozzles. Any standard commercial milk drying system may be employed to dry the product.

Figure 2:
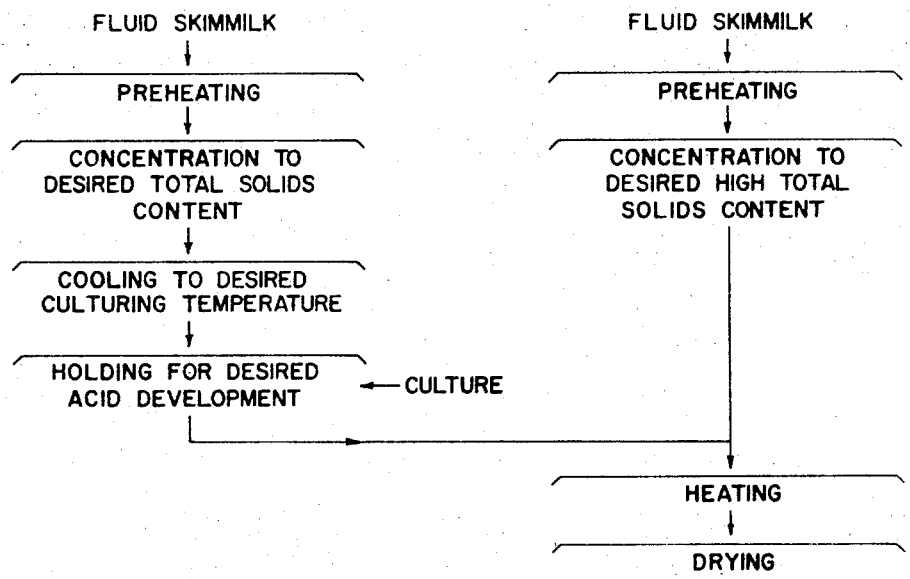
FIG. 2 is a flow sheet illustrating a modification of the manner in which my process may be practiced.

A modification of the manner in which my process may be practiced can be easily understood by reference to the flow sheet illustrated in FIG. 2. In my modified process, the fluid skim milk to be treated is preheated and cncentrated as described above. When the total solids content of the concentrate reaches approximately 20 to 30%, a portion of the concentrate, preferably approximately one-third of the total quantity being treated, is drawn off, cooled to the preferred culturing temperature and cultured until it reaches the desired level of titratable acidity as previously described. The uncultured portion of the concentrate is concentrated further to a total solids content of from approximately 40 to 45%, and the two separated portions are then blended. The blended concentrate is then heated to kill the bacteria therein and dried as previously described. An obvious variation of my alternative method is to separate the portion of the fluid skim milk to be cultured from the remaining portion prior to preheating and concentrating, and to maintain the portions separate until they are blended after concentration and culturing. This permits employment of different preheat conditions for the two portions. For example, the preheat temperature and duration employed for the portion to be cultured may approach maximum conditions within the preferred ranges to promote optimum growth of the bacterial culture during culturing, whereas minimal temperature and time conditions may be employed with the portion which is not cultured to minimize characteristics in the final product which may be undesirable for some product uses.

Various materials may be added at different stages of my above-described process to produce specialized products for particular uses. For example, fat products such as butter, butterfat, cream, or vegetable fat may be added in desired amounts to the fluid skim milk prior to heating and concentrating as shown in FIG. 3, to the concentrate prior to culturing, and to the cultured concentrate prior to drying to produce final products having the desired characteristics. Flavoring materials may also be added in the amounts desired at the same stages of my process, FIG. 3 indicating the addition of flavoring to the concentrate. Likewise, emulsifiers such as those used in cake mixes may also be added at the same stages of the process where, for example, the final product is to be used as an ingredient in a cake mix.

Dry cultured buttermilk produced by my process differs from High Acid Cultured Buttermilk previously known to the trade in several important respects. Whereas High Acid Cultured Buttermilk has a very high titratable acidity in the area of .55% my dry cultured buttermilk typically has a much lower titratable acidity in the area of .28%. As a result my product may be used in many foods for which High Acid Cultured Buttermilk is unsuited. My dry cultured buttermilk, especially with the addition of whey product, also has a substantially lower solubility index than High Acid Cultured Buttermilk. In addition, my dry cultured buttermilk can be produced to specifications requiring a scorch pad not greater than A consistently, whereas high acid cultured buttermilk, due to insoluble casein particles, cannot.

Dry cultured buttermilk (especially with the addition of whey product) produced by my process, is a considerably more uniform product than sweet cream buttermilk powders, or high acid cultured buttermilk produced by methods used prior to this invention. Since it may be manufactured to have functional characteristics desired in specific finished food products, it is much more suitable for such products than dry sweet cream buttermilk which exists as a by-product of the butter churning process and receives little quality control when considering a specific use.

My modified dry cultured buttermilk also contains more water soluble proteins and less casein than other buttermilk products and thus, does not have a "binding" effect. Further, this product can be produced at a controlled bulk density so as to afford extreme uniformity in a dry blending line where buttermilk is one of a number of items supplied continuously to a dry mix being packaged. It will further give a slurry of much less viscosity than will normal high heat buttermilk powders.

It is understood that my invention is not confined to the particular process and product herein described, but embraces all such modified forms thereof as come within the scope of the following claims.

I claim:

1. A process for producing dry cultured buttermilk of improved taste and uniformity consisting essentially of the steps of:
   (a) preheating a quantity of fluid skim milk to a temperature between approximately 160° and 190° F. for a duration of between approximately 30 seconds and 30 minutes,
   (b) concentrating said skim milk to a total solids content of from approximately 20 to 45%,
   (c) cooling the resulting concentrate to a temperature of from approximately 70° to 90° F.,
   (d) culturing said concentrate by innoculation with a lactic acid producing active bacterial culture and holding said innoculated concentrate within said indicated temperature range until it reaches the desired level of titratable acidity of approximately .20 to .30%,
   (e) heating said cultured concentrate to a temperature of at least 160° F. for a period of time sufficient to kill the bacteria therein, and
   (f) drying said cultured concentrate.

2. The process described in claim 1 wherein the amount of bacterial culture added by innoculation comprises between approximately 1 and 5% of the concentrate.

3. The process described in claim 1 wherein a quantity of whey product is added to the product being treated, said quantity being between approximately 5 and 15% on a solids basis of the amount of product being treated, said whey product being added to the product being treated before at least one of the following steps of treatment:
   (a) concentrating the fluid skim milk,
   (b) culturing the concentrate, and
   (c) drying the cultured concentrate.

4. A process for producing dry cultured buttermilk of improved taste and uniformity, consisting essentially of the steps of:
   (a) preheating a quantity of fluid skim milk to a temperature between approximately 160° and 190° F. for a duration of between approximately 30 seconds and 30 minutes,
   (b) concentrating said skim milk to a total solids content of from approximately 20 to 30%,
   (c) cooling a portion of the resulting concentrate to a temperature of from approximately 70° to 90° F.,
   (d) culturing said portion of said concentrate by innoculation with a lactic acid producing active bacterial culture and holding said innoculated concentrate within said indicated temperature range until it reaches the desired level of titratable acidity of approximately .20 to .30%,
   (e) continuing to concentrate said remaining portion of said concentrate to a total solids content of from approximately 40 to 45%,
   (f) blending said cultured portion of said concentrate with said additionally concentrated remaining portion,
   (g) heating said blended concentrate to a temperature of at least 160° F. for a period of time sufficient to kill the bacteria therein, and
   (h) drying said blended concentrate.

5. The process described in claim 4 wherein a quantity of whey product is added to the product being treated, said quantity being between approximately 5 and 15% on a solids basis of the amount of product being treated, said whey product being added to the product being treated before at least one of the following steps of treatment:
   (a) concentrating the fluid skim milk,
   (b) culturing the concentrate, and
   (c) drying the blended concentrate.

6. The process described in claim 4 wherein the portion of the concentrate which is cultured comprises approximately one-third of the total concentrate.

References Cited

UNITED STATES PATENTS

| | | | |
|---|---|---|---|
| 1,000,686 | 8/1911 | Merrell | 99—59 X |
| 2,602,747 | 7/1952 | Meade | 99—56 |
| 2,671,729 | 3/1954 | Feat et al. | 99—59 X |
| 2,749,242 | 6/1956 | Stimpson et al. | 99—55 |
| 3,378,375 | 4/1968 | Little | 99—59 |

FOREIGN PATENTS

| | | |
|---|---|---|
| 677,531 | 8/1952 | Great Britain. |
| 840,568 | 7/1960 | Great Britain. |

OTHER REFERENCES

Manual for Dairy Manufacturing Short Courses, Dairy Manufacturing Division, The Pennsylvania State University (pp. 57–59).

LIONEL M. SHAPIRO, Primary Examiner

D. M. NAFF, Assistant Examiner

U.S. Cl. X.R.

99—55, 201